May 29, 1951
L. C. YOUNG ET AL
2,554,515
RADIO RANGING SYSTEM
Filed Aug. 6, 1938
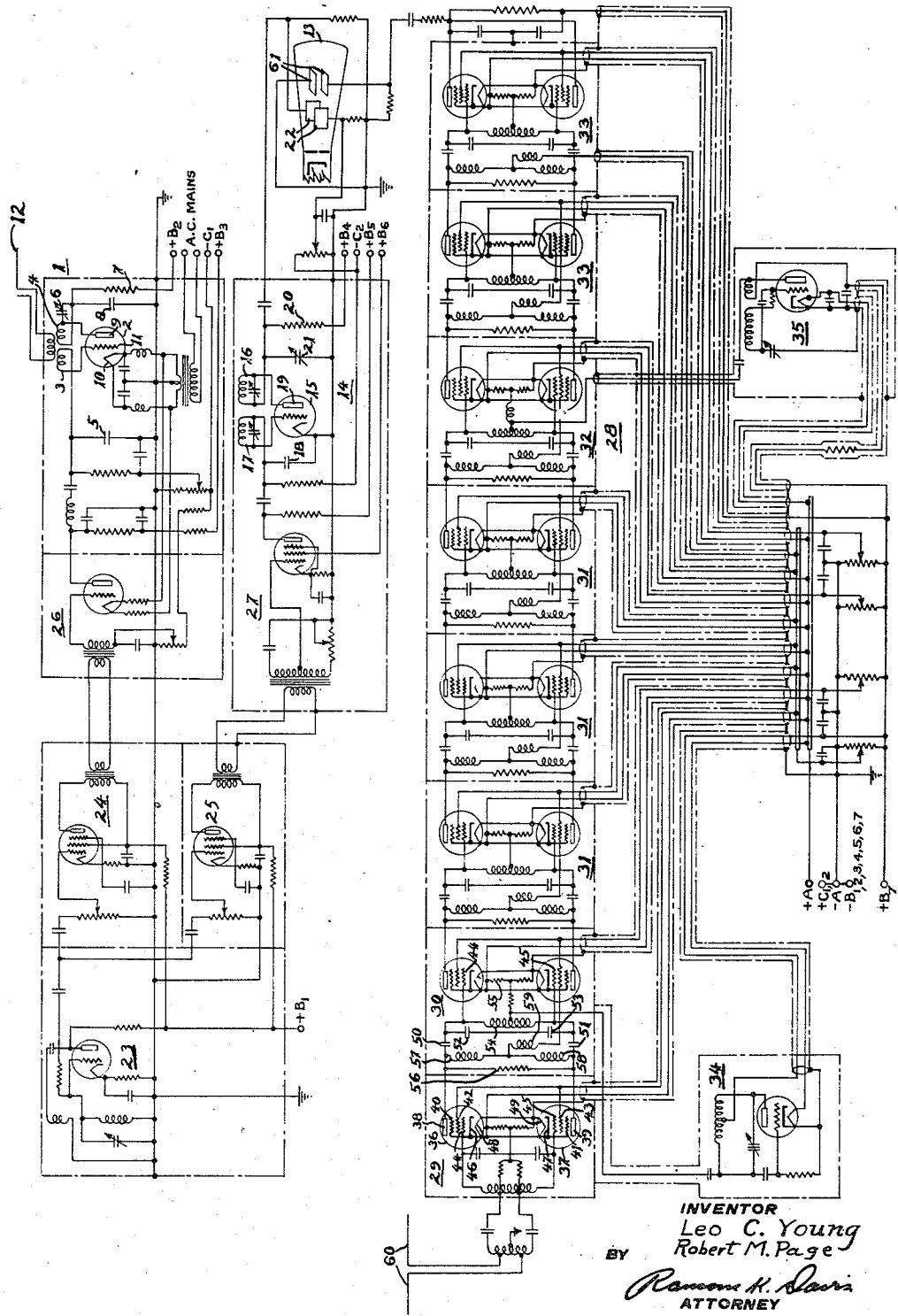
INVENTOR
Leo C. Young
Robert M. Page
BY
Ramon H. Davis
ATTORNEY Patented May 29, 1951

2,554,515

UNITED STATES PATENT OFFICE 2,554,515

RADIO RANGING SYSTEM

Leo C. Young, Hyattsville, Md., and Robert M. Page, Washington, D. C.

Application August 6, 1938, Serial No. 223,502

19 Claims. (Cl. 343—13)

(Granted under the act of March 3, 1883, as amended April 30, 1928; 370 O. G. 757)

This invention relates to means for ranging (or measuring distances) and detecting remote objects such as ships, aircraft, etc., by means of high frequency radio waves and the echoes of such waves reflected from the object whereof the distance and direction are to be measured or the presence is to be determined.

Among the numerous objects of this invention are:

To provide a system capable of emitting radio frequency energy in short pulses at very high power levels;

To provide a system of the type specified having self-keying transmitter to emit pulses as aforesaid completely without radiation between pulses, the duration of the pulses being short as compared with the interval between pulses;

To provide a system of the type specified having means for generating an exponential time axis in an oscilloscope synchronized with the pulses of the transmitter;

To provide a receiver capable of responding to the echoes of the pulses, which receiver shall afford very high amplification in a practically operable number of stages, shall be able to build up a sufficiently high percentage of full response amplitude in the duration of a pulse, and shall have such time constants that it will recover from saturation at several hundred volts in a time interval on the order of a pulse length;

To provide a system as above set forth that will be practically operable and usefully accurate over the desired range of distances;

To provide means of the type specified adapted for detecting aircraft and measuring the distance and direction thereto, for finding the range and bearing of a target and other gun fire control purposes.

Other objects will become apparent to those skilled in this art from the following description when read in connection with the accompanying drawing, wherein is schematically depicted a system that has been successfully operated. It is to be understood that where specific values are set forth and particular arrangements of elements are described, they are given solely by way of concrete illustration and not of limitation, the scope of this invention being limited solely by the appended claims.

Referring now to the drawing, the unit designated in general by the numeral 1 is a radio frequency pulse transmitter capable of radiating wave trains of radio frequency energy at very high power levels and of extremely short duration, wholly without radio frequency oscillation between the pulses. This unit comprises a vacuum tube 2 having associated therewith an oscillatory network including the coupled inductances 3 and 4 and capacitances 5 and 6. The anode supply is fed through a high resistance 7 that is effectively in parallel with a capacitance 8 connected between the anode 9 and cathode 10 of tube 2. The grid 11 is so biased that tube 2 will not oscillate until the voltage applied to anode 9 reaches a predetermined minimum value. Owing to the electrical relation of resistance 7 and capacitance 8 the latter is charged by the energy in the anode supply and since resistance 7 is of high value the voltage of capacitance 8, and consequently the voltage applied to anode 9, increases slowly and finally attains the value at which tube 2 is set into oscillation. When oscillations begin, they are maintained by the discharge through tube 2 of the energy stored in capacitance 8 and continue until the energy thus supplied diminishes to a point beyond which oscillations cannot be maintained, the source of plate supply indicated as +B2 being insufficient alone to supply current through resistance 7 to keep the tube in oscillating condition. The time of oscillation, or emission of a pulse, is very short compared with the interval required to recharge capacitance 8 to a potential that will initiate oscillations and hence the tube is passing current during only a small fraction of the time and for this reason it is not damaged by the very heavy outputs, in excess of a hundred times the rated capacity of the tube. Signal pulses of less than one microsecond may be produced at high power levels. It is thus apparent that while the transmitter unit may be self-keying, the emission of the pulses is controlled by the audio oscillator as hereinafter described and the pulses radiated from antenna 12 will follow each other at regular intervals. A more complete description of the construction and operation of this transmitter unit is set forth in the co-pending application of Robert M. Page, Ser. No. 223,503, filed August 6, 1938, Patent No. 2,541,092, dated February 13, 1951, but the foregoing is deemed sufficient for present purposes wherein the transmitter is but a unit in the complete system.

The cathode ray tube oscilloscope 13, of well-known construction, is connected to the sweep circuit designated generally by the numeral 14 which generates an exponential time axis in the oscilloscope. This unit comprises a vacuum tube 15 having operatively associated with it an oscillatory network including the parallel tuned resonant circuits 16 and 17 and capacitance 18. The voltage supplied to anode 19 is through high resistance 20 that charges a capacitance 21 connected to impress a voltage upon the anode 19. The functioning of the capacitance 21 and resistance 20 are the same as above described in connection with capacitance 8 and resistance 7 and thus the sweep circuit 14 applies to the deflecting plates 22 of cathode ray tube 13 a periodic voltage that generates an exponential time axis in the tube 13.

The operation of sweep circuit 14 is synchronized with the pulses radiated from transmitter 1 by means of an audio oscillator 23 of conventional construction, which controls the frequency of the sweep of the time axis, coupled to two buffer amplifiers 24 and 25, also of conventional construction, whereof the former feeds into the conventional synchronizing amplifier 26 coupled to transmitter 1 and the latter into conventional synchronizing amplifier 27 coupled to sweep circuit 14. As examples of frequencies that have been used in certain cases, when the pulse duration of transmitter 1 is three micro-seconds the frequency of oscillator 23 was 3728 cycles per second for distances of 25 miles and 1864 cycles per second for distances of 50 miles. The sweep circuit 14 is fully described and claimed in Patent 2,218,549 to L. R. Philpott, dated October 22, 1940.

While many sweep circuits are known in the art, that give not only linear but circular, elliptical and sinusoidal sweeps, they are not equally well adapted to the present purpose. In all cases, the length of the timing line is limited by the physical dimensions of the cathode ray screen, the range of the instrument is proportional to the time length of the line, and the accuracy of indication is proportional to the velocity of the tracing spot in the line. These three factors are so interrelated that with a given cathode ray tube and sweep circuit, range and accuracy of indication are inversely proportional, and have such values that the desired range and accuracy of indication cannot be secured simultaneously with any previous known sweep circuits. The sweep circuit 14 gives an exponential time axis, which provides a compromise by giving high indicating accuracy for small distances, with diminished indicating accuracy at the greater distances.

In operation, the period of the time axis of the oscilloscope is given such value that echoes from an object within the maximum range it is desired to cover are received in a single sweep of the time axis. When there is doubt whether the echo is returned in a single sweep the frequency of the sweep may be changed and if the distance indication remains the same it is known that the echo is returning in the sweep that was begun when the signal was sent out. Also, there are generally stationary indications due to echoes from fixed objects and if, when the sweep frequency is varied the position of the indication that is uncertain varies at the same rate as the stationary indications it is known that the echo is being received on the first sweep.

Since time and distance are directly proportional, the oscilloscope may be calibrated by applying an alternating voltage of suitable known frequency to the deflecting plates 61 and marking on the oscilloscope or on a scale attached thereto the positions of the full or half-wave intercepts on the time axis.

Necessary characteristics of a receiver suited to the service for which the present invention is intended are:

(a) Complete recovery from saturation by signal levels of several hundred volts in a matter of two or three micro-seconds.

(b) Overall decrement of tuned circuits such as to build up to 90 percent of full response or fall off to 10 percent of attained response in approximately two to three micro-seconds.

(c) Voltage gain from first grid to last plate on the order of one hundred million with complete stability.

(d) Saturation at approximately 150 volts peak output.

Consideration of the energy levels and time intervals involved will reveal the necessity for these characteristics. Velocity of propagation is such that echoes from objects will follow the original pulse with a time delay of one micro-second for every 160 yards distance from the measuring apparatus to the reflecting object. The energy received in the reflection is less than the energy received by direct radiation from the transmitter by a factor proportional to something like the eighth power of the ratio of distance reflecting object to receiver to distance transmitter to receiver, multiplied by the reflecting or scattering efficiency of the object in the direction of the receiver, and by the relative transmission in the direction of the receiver to that in the direction of the object. The length of the transmitted pulse also must have a finite value considerably greater than the period of the radio frequency oscillations.

Let us now postulate the reasonable and attainable values of one micro-second for the pulse length and two micro-seconds for the recovery time of the receiver. The receiver would then be capable of registering the beginning of an echo signal three micro-seconds after the beginning of the transmitted pulse and no sooner. This time interval corresponds to a distance of 480 yards between a transmitter and reflecting object. For reasons irrelevant to this description it is desirable and often necessary to locate transmitter and receiver very close together. Let us assume the antenna separation to be ten yards, which is reasonable and greater than can be allowed in some cases. Let us assume further that by directive antennae and shielding it is possible to get a signal gain in the direction of the reflecting object over that in the direction of the receiver of 40 decibels or $10^4$ in energy. By signal gain is meant the ratio of the effectiveness of transmission toward the object to the effectiveness of transmission toward the receiver. Then if the scattering efficiency of the object in the direction of the receiver is 10 percent, the ratio of received direct energy to received echo energy would be $$\left(\frac{480}{10}\right)^8 \times 10 \times 10^{-4} = 2.8\,(10)^{10}$$

or 28 billion. This represents a voltage input ratio at the receiver of about 170,000 for the nearest and strongest reflection that could be expected, as all the values assumed above are reasonable. For greater distances or less favorable conditions, the ratio may be greater by many thousand times. In some cases, production of a reflected signal of sufficient amplitude to ride through local noise requires a transmitter output of such level that the direct signal on the receiver is many thousand times the signal required to saturate the receiver. Thus the necessity of the first characteristic is established.

The desirability of a very short radiated pulse is apparent from the preceding paragraph. The signal reflected from some one object can be no longer than the original pulse. If the receiver decrement is such that the receiving circuit oscillations cannot build up to nearly full amplitude (in the duration of the pulse), then sensitivity to echo signal is lost even though the steady state gain, and therefore the noise amplification, remains high. Not only must these circuit oscillations build up rapidly, but they must also die away rapidly when the signal ceases, so as not to cause a "blurring over" from one signal to the next. These factors are too obvious to warrant further elucidation, and establish the necessity of the second characteristic.

The indicating means must be without sensible inertia. The best, if not the only, such means known is the cathode ray oscilloscope. Satisfactory operation of this instrument requires a signal terminal voltage of not less than ten volts, preferably a hundred. The receiver output must therefore equal or exceed ten volts peak. The cathode ray oscilloscope has the additional advantage of high discrimination between regularly recurrent voltages, such as the desired signals and random voltages, such as noise. By its use, echo signals whose peak amplitude is considerably less than the first circuit noise level may readily be detected, even in the presence of severe atmospheric static. The ratio of 10 volts, the lowest usable output, to 0.1 microvolt, the order of magnitude of weak echo signals which may be detected, is one hundred million. This represents the minimum gain required for maximum possible results. Any tendency toward instability would decrease the decrement and increase the "relaxation time" of the circuits.

If the output voltage on strong signals goes much over 150 or 200 volts, the cathode ray deflection becomes excessive and may throw the indicating spot clear off the screen. This would render the indication less positive, if not entirely confusing. With some sweep circuits especially applicable to this system, excessive signal output voltages would materially confuse the indication. Limitation of output voltages to a maximum peak between 100 and 200 volts is therefore considered necessary.

The receiver 28 comprises a plurality of push-pull stages of which there are eight in the instance depicted on the drawing. This diagram shows a radio frequency stage 29, a first detector stage 30, three transfer frequency stages 31, a second detector 32 and a second transfer frequency stage and a final rectifier stage 33. The oscillators 34 and 35 are respectively coupled to detector stages 30 and 32 according to the usual practice. Each stage comprises two vacuum tubes 36 and 37 having anodes 38 and 39, suppressor grids 40 and 41, screen grids 42 and 43, control grids 44 and 45, cathodes 46 and 47 and heater filaments 48 and 49. The anodes 38 and 39 are respectively coupled to control grids 44 and 45 of the succeeding stage through coupling capacitances 50 and 51 and the parallel tuned circuit comprising capacitances 52 and 53 and inductance 54. The midpoint or point of electrical symmetry of inductance 54 is connected to an intermediate point of a potentiometer 55 connected across the filaments of the tubes of the following stage and a resistor 56 is connected across between the anodes 38, 39 of the tubes in each stage. Anode voltage reaches the anodes after passing through chokes 57 or 58, as the case may be, and choke 59. Antenna 60 picks up the radiations and feeds them to radio frequency stage 29. Final stage 33 is coupled to the plates 61 of cathode ray tube 13 so that the received amplified impulse is impressed on the electron stream in the oscilloscope to cause an indication to be given when an impulse is received, as is well-known in this art. Each stage is well shielded, as are the supply leads to each stage, as indicated in the drawing by the conventional symbol of broken lines.

The principles underlying the construction of receiver 28 above described will best be made clear by a brief review of some fundamental principles of radio receiver operation. When a vacuum tube amplifier stage is subjected to an input signal greater than the minimum input required to give maximum output, the stage is said to be saturated. Under these conditions the amplifier stage will not amplify a weaker signal which may be present on the input. If the saturating signal be suddenly removed from the input, the sensitivity of the amplifier stage to weaker signals does not return instantaneously, but is delayed by a time interval dependent largely on the constants of the circuit. This delay in return to full sensitivity is due in general to the fact that electrical charges stored in circuit capacities are changed by the saturating signal, and must be restored to normal values after termination of the signal by charging or discharging currents flowing through circuit resistances. The time required for restoring sensitivity depends on the capacitance whose charge is changed, the resistance through which the restoring current flows and the relative restoration of charge conditions necessary to produce the required degree of sensitivity.

The capacity most subject to change in charge under influence of a saturating signal is the total ground capacity of the amplifier grid 44 plus the inter-stage coupling capacity 50. The ground capacity is kept low by using a type 954 vacuum tube, whose input capacity is very low and whose socket and wiring capacities can be made negligible, and by designing the inductance 54 for minimum distributed capacity. The effect of the tuning capacity 52 is eliminated by using a push-pull amplifier and connecting the tuning capacitance directly between grids with no connection to ground and negligible capacity to ground. The inter-stage coupling capacity is made as low as is consistent with reasonable coupling efficiency. For given coupling efficiency the coupling capacity may be decreased as grid impedance is increased. The highest impedance element of the coupling circuit, inductance 54, is therefore placed in the grid circuit.

The principal resistance involved is that in the D. C. circuit from grid to ground. This is made low by making the grid D. C. return through the tuning coil 54. The circuit shows this return to potentiometer 55 across the filament. This is a device for obtaining fixed grid bias, and the resistance so inserted is so small as to have little influence on recovery time. The plate circuit resistance, which is next in importance, is made low by using inductance as a coupling impedance.

The relative restoration of charge necessary to produce the required degree of sensitivity is largely a function of internal characteristics of the vacuum tube and the level and duration of the saturating signal. It is estimated that under average conditions, the relative restoration should be about 99.99 percent of the change in charge. The resulting recovery time is then about twelve times the maximum R–C product, with time expressed in micro-seconds, R in ohms and C in micro-farads. With a maximum capacity of 50μμf. and a maximum resistance of 1,000 ohms, the recovery time of one stage would be 0.6 μsec. The recovery time of a receiver blocked by this cause is equal to that of the stage slowest to recover individually.

When a resonant signal of constant power is impressed suddenly on a parallel tuned circuit, the alternating voltage across the circuit does not appear immediately at full value, but builds up exponentially, approaching full value asymptotically. The number of cycles that pass into the circuit in the time required to build up the terminal voltage to a certain percentage of full value is determined by the decrement of the circuit, and is directly proportional to the ratio of reactance to series resistance, which ratio is defined as the "Q" of the circuit. The time required for one tuned circuit to build up to $$\left(1-\frac{1}{e}\right)$$

times full voltage (approximately 63 percent) is $$t = 2Q/\omega \qquad (1)$$

where $$Q = \frac{X}{R}$$

and $$\omega = 2\pi$$

times frequency. If the input signal is not impressed suddenly, but itself builds up gradually, the build-up of the terminal voltage will lag behind the build-up of the input signal by an amount depending on $$\frac{X}{R}$$

Now consider a radio frequency receiver consisting of a number of parallel tuned circuits connected in cascade relationship by means of vacuum tube amplifiers. Under the influence of a constant level signal suddenly impressed on the input terminals, the first circuit will build up to say 90 percent of full value in a certain time, the second circuit will reach 90 percent of full value a little later, the third circuit still later, and so on to the output circuit. Thus a considerable time may elapse after the signal is impressed on the input before the output circuit fully responds to that signal. If the signal is removed before the build-up is complete, the output circuit will never reach full amplitude. The time required for final circuit build-up when the decrements of all circuits are approximately equal is $$t = \frac{2QB}{\omega} \qquad (2)$$

where B is a factor depending on the number of independent tuned circuits in the chain and the percentage of full amplitude reached by the final circuit. It may be determined from the relationship $$A/A_0 = 1 - e^{-B}\left[1 + \sum_{m=1}^{n-1}\frac{B^m}{m!}\right] \qquad (3)$$

where $A$ = amplitude actually reached
$A_0$ = full amplitude for the steady state condition
$e$ = natural logarithm base
$n$ = the number of independent tuned circuits in the chain and is greater than one
$m$ = any whole number between 1 and $n-1$, both inclusive.

By way of example, let $A/A_0 = 0.9$, thus allowing the final circuit to reach 90 percent of full value, and assume the number of tuned circuits to be eight, as in the receiver 28. Then $B = 11.8$. Now let $t = 3(10)^{-6}$ (three micro-seconds) as above specified, and $$\frac{Q}{\omega} = \frac{t}{2B} = \frac{3(10)^{-6}}{2 \times 11.8} = 1.27(10)^{-7} = \frac{Q}{2\pi f}$$

from which $Q = 8(10)^{-7}f$, or $Q = 0.8F$ where F is frequency in megacycles and Q is $X/R$ for one circuit.

When a steady state input signal is removed, the tuned circuit oscillations tend to persist, and die away in exactly the same manner as they build up, requiring the same time to reach a given percentage of final state in either direction. Thus it is seen that in order to decrease the time required for a receiver to respond to a change in signal level, the Q of the tuned circuits in the amplifier chain must be reduced. This may be done either by increasing the series resistance in the tuned circuit or decreasing the parallel resistance across the tuned circuit. In the circuit of receiver 28, the parallel resistance across each tuned circuit consisting of vacuum tube output impedance and input resistance is further reduced by the addition of fixed resistor 56 connected from plate to plate. The value of this resistor is so chosen as to reduce the tuned circuit Q to the desired value. Of course, there are many ways of inserting losses into a tuned circuit thereby reducing the Q, but all may be reduced to terms of series or parallel resistance. The capacity across each resistor so inserted does not increase the recovery time because it adds to the capacity from grid to grid and not from grid to ground.

If the amplitude of tuned circuit oscillation were allowed to increase without any limit other than the input signal level, the differences in energy level would require a much faster oscillation decay than that indicated above in order to prevent the tuned circuit "ring" from maintaining a saturating voltage on tubes long after the direct signal has ceased. This is automatically taken care of by the diode limiting action of the vacuum tube grids, 44 and 45, when these grids are driven positive. The maximum amplitude to which the tuned circuit oscillation can rise is made as low as possible without loss of gain for weak signals by biasing the amplifier grids just below the grid current cut-off and then reducing screen voltage to prevent excessive emission current. Full gain is maintained until the signal peaks reach a moderate fraction of a volt, then signal amplitude is sharply limited by grid current even though the input builds up to several hundred volts. Thus at the termination of the saturating direct signal, the tuned circuit oscillations have to decay merely from a few tenths of a volt. Fortunately this condition is favored by low grid resistance so necessary to quick recovery.

The voltage gain of a vacuum tube amplifier stage is approximately equal to the mutual conductance of the tube employed times the load impedance into which the tube works, providing this load impedance is small relative to the plate impedance of the tube. The load impedance presented by a tuned circuit is $Q/\omega C$, where C is the total tuning capacity, and the limitations on Q and C are such that the stage gain may be fairly represented by $S_mQ/\omega C$. The overall receiver gain is then approximately $$G = [S_mQ/\omega C]^{(n-D)} \qquad (4)$$

where $S_m$ is mutual conductance, $n$ is the number of tuned circuits, and D is the excess of tuned circuits over amplifier stages. In most cases D will be the number of detectors. Substituting (2) in (4) we get $$G = \left[\frac{S_m t}{2CB}\right]^{(n-D)} \qquad (5)$$

Since $S_m$ is limited by the vacuum tube used, $t$ is fixed by conditions to be satisfied in use and B is a function of $n$ as expressed in Equation 3, the maximum gain per stage occurs with minimum tuning capacity and is independent of frequency so far as $S_m$ is independent of frequency. Other things being equal, overall gain will increase as $n$ is increased and as B is decreased. But Equation 3 shows that $n$ and B must increase together. For any value of $A/A_0$ there is a value of $n$ which, with its corresponding value of B, will give maximum possible overall gain. If the last circuit of the receiver is allowed to reach 90 percent of full response to a change in input level in the time $t$ under conditions of linear amplification, maximum theoretical gain occurs when $$(n+1)e^{\left(\frac{n-D}{n+1}\right)} = \frac{S_m t}{2.6C} \qquad (6)$$

The absolute value of that gain, assuming unity gain for all detectors is $$g = e^{\frac{(n-D)^2}{n+1}} \qquad (7)$$

and the gain per stage is $$g_s = e^{\frac{n-D}{n+1}} \qquad (8)$$

Substituting in Equation 6 the values $(10)^{-3}$ for $S_m$ and $(10)^{-11}$ for C, both obtainable in practice, and $3(10)^{-6}$ for $t$ as specified above, $n=42$ and $g_s=2.72$. Limiting the gain on one frequency to $10^3$ in the interest of stability, $D=5$ and the maximum theoretical overall gain is about $10^{16}$.

These results merely prove that conditions (a) and (b) above can be simultaneously fulfilled. Now it is hardly practical to use 42 stages in cascade in a receiver, but also a voltage gain of $10^{16}$ would be useless because of the ratio between first circuit noise and output saturation. The desired gain of $10^8$ may be had with fewer stages, and the conditions of receiver 28 were finally worked out to be approximately as follows:

$n$—There are eight tuned circuits, therefore $n=8$.
D—There are five amplifier stages, therefore $D=8-5$, or $D=3$.
$S_m$—The bias and screen voltages of the tubes are such as to produce a mutual conductance of 1500 mhos, so $S_m=1.5(10)^{-3}$.
C—The total tuning capacity is approximately 5 μμf, but this is in a double-ended circuit. The plate load per tube at resonance is one half the resonant impedance of the circuit, so the effective value of C is $10^{-11}$.
$t=3(10)^{-6}$.
Gain—Since these are not maximum gain conditions, Equations 6, 7, and 8 do not apply. From Equation 3 $B=11.8$. Then from Equation 5 gain per stage is 19.1 and overall amplifier gain is $2.5(10)^6$. Of the three additional tuned circuits, two are associated with frequency converters which have a signal gain of about seven each, or a total additional gain of 49. The total overall gain is therefore $$49 \times 2.5(10)^6 = (10)^8$$

Complete receiver stability, which means practical freedom from regeneration, is obtained through four particular precautions. (1) Every amplifier stage is completely shielded from all other stages; (2) all supply lines to each stage are individually filtered with ample capacity to a common ground; (3) frequency is changed twice to avoid very high amplification on any one frequency, and (4) the last stage is a rectifier with the output well grounded for radio frequency, so that the cathode ray tube 13 and the leads thereto are all at radio frequency ground potential.

The maximum output level is limited by the plate load resistance and the plate and screen supply voltages for the output stage. These are so proportioned that by variation of the screen potential the saturation level may be varied from zero to about 150 volts.

It will be understood that while a push-pull superheterodyne receiver is shown and described for purposes of concrete illustration, other types have been successfully used and are contemplated to be used, the only requisite being that the receiver be able to fulfill the required conditions. Also, it will be understood that for determination of directions a directional antenna must be used.

Also, synchronization of the transmitter pulses and the sweep circuit may be effected by means other than those shown. For example, the transmitter may be unblocked to emit a pulse, by energy from the sweep circuit, which latter may be self-keying. Or, conversely, the sweep may be controlled by rectified current from the transmitter through electrical connection between the two circuits, or by radio frequency picked up after radiation by the transmitter.

The invention herein described and claimed may be used and/or manufactured by or for the Government of the United States of America for governmental purposes without the payment of any royalties thereon or therefor.

We claim:

1. A system as described, comprising an audio oscillator, two buffer amplifier means coupled to be fed by the output of said oscillator, a synchronizing amplifier respectively coupled to the output of each of said buffer amplifiers, a transmitter coupled to be controlled by one of said synchronizing amplifiers, said transmitter including an oscillatory network and circuit means to cause said transmitter to emit energy in pulses wholly without radiation between said pulses; a cathode ray tube, and means controlled by the other of said synchronizing amplifiers and connected to said tube to define an exponential time axis in said tube; and receiving means to receive energy of the frequency emitted by said transmitter including an antenna, a plurality of cascade coupled stages of vacuum tubes in push-pull connection fed from said antenna, each of said tubes including a cathode, a filament, an anode, a control grid and a screen grid, an inductance of low distributed capacity connected between the control grids of the tubes of each stage, two tuning capacitances in series connected in parallel with each of said inductances, a coupling capacitance respectively connecting the anode of each tube in each stage except the last to a corresponding point of the following inductance and tuning capacitances, a resistance connected between the anodes of the tubes of each stage ahead of the following tuning capacitances, a potentiometer across the filaments in each stage, means connecting an intermediate point of each potentiometer to the midpoint of the said inductance connected to the grids of the same stage, means connecting the last of said stages to said cathode ray tube, two oscillators operatively connected to different stages to produce two frequencies other than the received frequency, said control grids of the remaining stages being biased just below the point of grid current cutoff, the bias on said screen grids of said remaining stages being reduced to prevent excessive emission current, and means thoroughly shielding each said stage of the receiving means and the supply leads thereto.

2. A system as described, comprising a transmitter that includes an oscillatory network and circuit means to cause said transmitter to emit energy in pulses wholly without radiation between pulses; an oscilloscope, means to actuate said oscilloscope to define an exponential time axis; means to synchronize said time axis with the pulses emitted from said transmitter; and receiving means to receive energy of the frequency emitted by said transmitter including an antenna, a plurality of cascade coupled stages of vacuum tubes in push-pull connection fed from said antenna, each of said tubes including a cathode, a filament, an anode, a control grid and a screen grid, an inductance of low distributed capacity connected between the control grids of the tubes of each stage, two tuning capacitances in series connected in parallel with each of said inductances, a coupling capacitance respectively connecting the anode of each tube in each stage except the last stage to a corresponding point of the following inductance and tuning capacitances, a resistance connected between the anodes of the tubes of each stage ahead of the following tuning capacitances, a potentiometer across the filaments in each stage, means connecting an intermediate point of each potentiometer to the midpoint of the said inductance connected to the grids of the same stage, means connecting the said last stage to said oscilloscope, two oscillators operatively connected to different stages to produce two frequencies other than the received frequency, said control grids of the remaining stages being biased just below the point of grid current cutoff, the bias on said screen grids of said remaining stages being reduced to prevent excessive emission current, and means thoroughly shielding each said stage of the receiving means and the supply leads thereto.

3. A system as described, comprising a transmitter that includes an oscillatory network and circuit means to cause said transmitter to emit energy in pulses wholly without radiation between pulses, an oscilloscope, means to actuate said oscilloscope to define an exponential time axis; means to synchronize said time axis with the pulses emitted from said transmitter; and superheterodyne receiving means to receive energy of the frequency emitted by said transmitter including an antenna, a plurality of push-pull stages in cascade, each of said stages including two vacuum tubes each having a cathode, a filament, an anode, a control grid and a screen grid; a tuning coil of low distributed capacity constituting the highest impedance in the coupling circuit between each of two stages connected between the control grids of the tubes in each stage, two tuning capacitances in series connected in parallel with each of said tuning coils whereby said capacitances do not affect the time of recovery from saturation, a potentiometer of low resistance having little effect on said recovery time connected across the filaments of the tubes in each stage, means connecting an intermediate point of each of said potentiometers to the midpoint of the corresponding tuning coil, a coupling capacitance connecting the anode of each tube to the control grid of the corresponding tube in the following stage, a resistance connecting the anodes of the tubes in each stage ahead of said coupling capacitances, the control grids in the stages being biased just below the point of grid current cutoff, the bias on the screen grids in said stages being reduced to prevent excessive emission current, means thoroughly shielding each of said stages and the supply leads thereto, and means connecting the last of said stages to said oscilloscope.

4. A superheterodyne receiver, comprising a plurality of cascade coupled stages of vacuum tubes in push-pull connection, each said tube including a cathode, a filament, an anode, a control grid and a screen grid, an inductance of low distributed capacity connected between the control grids of the tubes of each stage, two tuning capacitances in series connected in parallel with each of said inductances, a coupling capacitance respectively connecting the anode of each tube in each stage except the last stage to a corresponding point of the inductance and tuning capacitances of the following stage, a resistance connected between the anodes of the tubes of each stage ahead of the following tuning capacitances, a potentiometer across the filaments in each stage, means connecting an intermediate point of each potentiometer to the midpoint of the said inductance connected to the grids of the same stage, two oscillators operatively connected to different stages to produce two frequencies other than the received frequency, said control grids of the remaining stages being biased just below the point of grid current cutoff, the bias on said screen grids of said remaining stages being reduced to prevent excessive emission current, and means thoroughly shielding each said stage of the receiving means and the supply leads thereto.

5. A superheterodyne receiver, comprising a plurality of push-pull stages in cascade, each of said stages including two vacuum tubes each having a cathode, a filament, an anode, a control grid and a screen grid; a tuning coil of low distributed capacity constituting the highest impedance in the coupling circuit between each two stages connected between the control grids of the tubes in each stage, two tuning capacitances in series connected in parallel with each of said tuning coils whereby the tuning capacity is not between the control grids and ground and consequently does not affect the time of recovery from saturation by high signal levels, a potentiometer of low resistance having little effect on said recovery time connected across the filaments of the tubes in each stage, means connecting an intermediate point of said potentiometer to the midpoint of the corresponding tuning coil, a coupling capacitance connecting the anode of each tube to the control grid of the corresponding tube in the following stage, a resistance connecting the anodes of the tubes in each stage ahead of said coupling capacitances, the control grids in the stages being biased just below the point of grid current cutoff, the bias on the screen grids in said stages being reduced to prevent excessive emission current, and means thoroughly shielding each of said stages and the supply leads thereto.

6. A superheterodyne receiver, comprising a plurality of amplifying and detecting stages suitably connected in cascade, each of said stage including two vacuum tubes in push-pull, each of said tubes having a cathode, a filament, an anode, a control grid and a screen grid, signal transfer means for each stage including a parallel tuned circuit connected between the control grids of the stage whereby the tuning capacitance of said tuned circuit is not between the control grids and ground and consequently has negligible effect upon the time of recovery of the stage from saturation by high signal levels, a capacitance coupling each terminal of said parallel tuned circuit to the anode of a respective tube in the preceding stage, a resistance connecting the anodes of the tubes in each stage whereby the Q of the circuit is reduced, a low resistance potentiometer across the filaments of the tubes in each stage, and means connecting a point of electrical symmetry on said potentiometer to a point of electrical symmetry on said tuned circuit, the bias on the said control grids of the amplifying stages being just below the point of grid current cutoff and the bias on the screen grids of the amplifying stages being reduced to diminish emission currents.

7. A superheterodyne receiver, comprising a a plurality of push-pull amplifying and detector stages, each of said stages including two vacuum tubes each having at least a cathode, a filament, an anode and a control grid, interstage coupling means between each two stages wherein the principal impedance is in the grid circuit of the later stage, said coupling means including a tuned circuit, means to reduce the ratio of reactance to series resistance in each of said tuned circuit, means connecting a point between the filaments of the tubes of each stage to a point of electrical symmetry of said impedance, whereby a steady bias is maintained on said grids, the said grids of the amplyfying stages being biased just below the point of grid current cutoff, and means thoroughly shielding each said stage and the supply leads thereto.

8. A system as described comprising a transmitter for emitting high frequency energy in pulses of short duration at energy levels many times the rated capacity of the elements thereof completely without radiation between pulses, an oscilloscope, means to generate in said oscilloscope a time axis synchronized with said pulses, said means comprising a high vacuum electron discharge apparatus including a cathode, an anode and a grid and having a tuned plate-tuned grid oscillatory network associated therewith, anode supply means including a resistance, means to bias said grid, means to apply to said grid a potential sychnronized with said pulses, and a capacitance connected at one side between the said resistance in the anode supply and the tuned plate portion of said network and at the other side to said cathode, a receiver to receive and amplify energy of the frequency emitted by said transmitter during the said pulses and means to apply the output of said receiver to said oscilloscope to indicate on said time axis the reception of energy by said receiver.

9. A system as described comprising a transmitter for emitting high frequency energy in pulses of short duration at energy levels many times the rated capacity of the elements thereof completely without radiation between pulses, an oscilloscope, means to generate in said oscilloscope a time axis synchronized with said pulses, said means comprising a high vacuum electron discharge apparatus including a cathode, an anode and a grid and having a tuned plate-tuned grid oscillatory network associated therewith, anode supply means including a resistance, means to bias said grid, means to apply to said grid a potential synchronized with said pulses, and a capacitance connected at one side between the said resistance in the anode supply and the tuned plate portion of said network and at the other side to said cathode, a receiver including circuit elements having such values so that the receiver recovers completely from saturation by signal levels of several hundred volts in 3 microseconds or less, has an overall decrement such that it builds up to substantially 90% of full response or falls off to approximately 10% of attained response in 3 microseconds or less, has a voltage gain of at least 100,000,000 with complete stability and is saturated at approximately 150 volts, and means to apply the output of said receiver to said oscilloscope to indicate on said time axis the reception of energy by said receiver.

10. A system as described, comprising an audio oscillator, two buffer amplifier means coupled to be fed by the output of said oscillator, a synchronizing amplifier respectively coupled to the output of each of said buffer amplifiers, a transmitter coupled to be controlled by one of said synchronizing amplifiers, said transmitter including an oscillatory network and circuit means to cause said transmitter to emit energy in pulses wholly without radiation between said pulses, a cathode ray tube and means controlled by the other of said synchronizing amplifiers and connected to said cathode ray tube to define an exponential time axis therein, said means comprising a high vacuum electron discharge apparatus including a cathode, an anode and a grid and having a tuned plate-tuned grid oscillatory network associated therewith, anode supply means including a resistance, means to bias said grid, means to apply to said grid a potential derived from said other synchronizing amplifier and a capacitance connected at one side between said resistance and said anode supply and tuned plate portion of said network and at the other side to said cathode, a receiver to receive and amplify energy of the frequency emitted by said transmitter during said pulses, and means to apply the output of said receiver to said cathode ray tube to indicate on said time axis the reception of energy by said receiver.

11. A system as described, comprising an audio oscillator, two buffer amplifier means coupled to be fed by the output of said oscillator, a synchronizing amplifier respectively coupled to the output of each of said buffer amplifiers, a transmitter coupled to be controlled by one of said synchronizing amplifiers, said transmitter including an oscillatory network and circuit means to cause said transmitter to emit energy in pulses wholly without radiation between said pulses, a cathode ray tube and means controlled by the other of said synchronizing amplifiers and connected to said cathode ray tube to define an exponential time axis therein, said means comprising a high vacuum electron discharge apparatus including a cathode, an anode and a grid and having a tuned plate-tuned grid oscillatory network associated therewith, anode supply means including a resistance, means to bias said grid, means to apply to said grid a potential derived from said other synchronizing amplifier and a capacitance connected at one side between said resistance and said anode supply and tuned plate portion of said network and at the other side to said cathode, a receiver including circuit elements so arranged and comprising such values so that the receiver recovers completely from saturation by signal levels by several hundred volts in 3 microseconds or less, has an overall decrement such that it builds up to substantially 90% of full response or falls off to approximately 10% of attained response in 3 microseconds or less, has a voltage gain of at least 100,000,000 with complete stability and is saturated at approximately 150 volts, and means to apply the output of said receiver to said cathode ray tube to indicate on said time axis the reception of energy by said receiver.

12. A system as described comprising a source of synchronizing voltage, a transmitter for emitting high frequency energy in pulses of short duration at energy levels many times the rated capacity of the elements thereof, totally without radiation between pulses, said transmitter comprising an electron discharge device, means normally rendering said discharge device non-conducting, means for storing energy, means periodically applying said stored energy to an element of said discharge device, and means for concurrently applying a voltage from said synchronizing source to said discharge device so that said transmitter emits pulses in synchronism with said voltage; an oscilloscope, means utilizing the voltage of said source to generate in said oscilloscope a time axis synchronized with said pulses, a receiver to receive energy of the frequency emitted by said transmitter in the duration of one of said pulses, and means to apply the output of said receiver to said oscilloscope to indicate on said time axis the reception of energy by said receiver.

13. A system as described comprising a source of synchronizing voltage, a transmitter for emitting high frequency energy in pulses of short duration at energy levels many times the rated capacity of the elements thereof, totally without radiation between pulses, said transmitter comprising an electron discharge device, means normally rendering said discharge device non-conducting, means for storing energy, means periodically applying said stored energy to an element of said discharge device, and means for concurrently applying a voltage from said synchronizing source to said discharge device so that said transmitter emits pulses in synchronism with said voltage; an oscilloscope, means to generate in said oscilloscope a time axis synchronized with said pulses, said means comprising a high vacuum electron discharge apparatus including a cathode, an anode and a grid and having a tuned plate-tuned grid oscillatory network associated therewith, anode supply means including a resistance, means to bias said grid, means to apply to said grid a potential synchronized with said pulses, and a capacitance connected at one side between the said resistance in the anode supply and the tuned plate portion of said network and at the other side to said cathode, a receiver to receive and amplify energy of the frequency emitted by said transmitter during said pulses, and means to apply the output of said receiver to said oscilloscope to indicate on said time axis the reception of energy by said receiver.

14. A system as described comprising a source of synchronizing voltage, a transmitter comprising an electron discharge device, means normally rendering said discharge device non-conducting, means for storing energy, means periodically applying said stored energy to an element of said discharge device, and means for concurrently applying a voltage from said synchronizing source to said discharge device so that said transmitter will in synchronism with said voltage emit high frequency energy in pulses of short duration at energy levels many times the rated capacity of the elements thereof, totally without radiation between pulses; an oscilloscope, means to generate in said oscilloscope a time axis synchronized with said pulses, said means comprising a high vacuum electron discharge apparatus including a cathode, an anode and a grid and having a tuned plate-tuned grid oscillatory network associated therewith, anode supply means including a resistance, means to bias said grid, means to apply to said grid a potential synchronized with said pulses, and a capacitance connected at one side between the said resistance in the anode supply and the tuned plate portion of said network and at the other side to said cathode, a receiver including circuit means so that the receiver recovers completely from saturation by signal levels of several hundred volts in 3 microseconds or less, has an overall decrement such that it builds up to substantially 90% of full response or falls to approximately 10% of attained response in 3 microseconds or less, has a voltage gain of at least 100,000,000 with complete stability and is saturated at approximately 150 volts, and means to apply to output of said receiver to said oscilloscope to indicate on said time axis the reception of energy by said receiver.

15. A system as described comprising a radio frequency pulse transmitter for periodically producing very short pulses, a cathode ray indicator tube, a deflection voltage generator feeding the cathode ray tube to produce a time axis therein, oscillation generator means for synchronizing operation of the pulse transmitter and the deflection voltage generator, receiving means becoming operative within the very short pulse period to amplify energy of the pulse transmitter frequency, and means to apply the output of the receiving means to the indicator tube to indicate on the time axis the reception of energy by the receiver.

16. A system including a pulse transmitter for radiating pulses, an oscilloscope, a deflection voltage generating means for the oscilloscope, oscillation generator means feeding a control signal to said transmitter and said deflection voltage generating means for establishing a definite time relation between operation of the deflection voltage generating means and the transmitter, and a receiver feeding the oscilloscope energy resulting from transmitter operation.

17. In the study of a recurrent phenomenon by its representative trace on the screen of a cathode ray oscilloscope provided at least with horizontal and vertical deflecting means, the method of producing in identical location on said screen successive traces each representative of a recurrence of said phenomenon which comprises generating a voltage pulse, producing from said pulse a deflecting voltage on said horizontal deflecting means, producing from said pulse in fixed time relation to said deflecting voltage a voltage initiating a recurrence of said phenomenon and producing from said phenomenon so initiated a deflecting voltage on said vertical deflecting means.

18. In the study of a recurrent phenomenon by its representative trace on the screen of a cathode ray oscilloscope provided at least with horizontal and vertical deflecting means, an apparatus for producing in identical location on said screen successive traces each representative of a recurrence of said phenomenon, said apparatus comprising voltage pulse generating means, sweep means producing from said pulse a deflecting voltage on said horizontal deflecting means, voltage generator means responsive to said pulse for producing a voltage initiating a recurrence of said phenomenon in fixed time relation to said deflecting voltage, and means producing from said phenomenon so initiated a deflecting voltage on said vertical deflecting means.

19. In combination, a pulse transmitter for periodically producing energy pulses, a cathode ray tube having deflecting means, a voltage generator for periodically producing a deflecting voltage on said deflecting means, an oscillation generator for producing a control signal, means applying said control signal to said transmitter to control the periodicity of said energy pulses, and means applying said control signal to control operation of said voltage generator so that the deflecting voltages are produced in fixed time relation with the energy pulses.

LEO. C. YOUNG.
ROBERT M. PAGE.

REFERENCES CITED

The following references are of record in the file of this patent:

UNITED STATES PATENTS

| Number | Name | Date |
|---|---|---|
| Re. 22,150 | Bagno | Aug. 4, 1942 |
| 1,867,214 | Elliott | July 12, 1932 |
| 1,871,740 | Roberts | Aug. 16, 1932 |
| 1,918,433 | Smythe | July 18, 1933 |
| 1,924,156 | Hart | Aug. 29, 1933 |
| 1,979,225 | Hart | Aug. 30, 1934 |
| 1,981,884 | Taylor et al. | Nov. 27, 1934 |
| 2,134,716 | Gunn | Nov. 1, 1938 |
| 2,143,035 | Smith | Jan. 10, 1939 |
| 2,146,769 | Schriever et al. | Feb. 14, 1939 |
| 2,152,335 | Trevor | Mar. 28, 1939 |
| 2,207,267 | Plaistowe | July 9, 1940 |
| 2,227,598 | Lyman | Jan. 7, 1941 |
| 2,328,248 | Andrieu | Aug. 31, 1943 |